United States Patent
Bozak et al.

(10) Patent No.: US 8,826,060 B2
(45) Date of Patent: Sep. 2, 2014

(54) CORRELATION OF LOG INFORMATION IN A DISTRIBUTED COMPUTING ENVIRONMENT USING RELATIVE TIMESTAMPS

(75) Inventors: Erol Bozak, Vinzentiusstrasse (DE); Alexander Gebhart, Akazienweg (DE)

(73) Assignee: SAP AG, Walldorf (DE)

(*) Notice: Subject to any disclaimer, the term of this patent is extended or adjusted under 35 U.S.C. 154(b) by 1743 days.

(21) Appl. No.: 11/833,909

(22) Filed: Aug. 3, 2007

(65) Prior Publication Data

US 2009/0038001 A1 Feb. 5, 2009

(51) Int. Cl.
- *G06F 1/04* (2006.01)
- *G06F 1/14* (2006.01)
- *H04L 12/26* (2006.01)
- *H04L 12/24* (2006.01)
- *H04L 29/06* (2006.01)

(52) U.S. Cl.
CPC ............ *H04L 43/106* (2013.01); *H04L 41/064* (2013.01); *H04L 41/0631* (2013.01); *H04L 41/22* (2013.01); *H04L 69/28* (2013.01)
USPC ............................................. 713/502; 726/14

(58) Field of Classification Search
CPC ........ H04L 69/28; H04L 41/064; H04L 41/22
See application file for complete search history.

(56) References Cited

U.S. PATENT DOCUMENTS

| | | | | |
|---|---|---|---|---|
| 5,408,506 A | * | 4/1995 | Mincher et al. | 375/134 |
| 5,471,631 A | * | 11/1995 | Beardsley et al. | 713/502 |
| 5,896,524 A | * | 4/1999 | Halstead et al. | 713/375 |
| 5,964,846 A | * | 10/1999 | Berry et al. | 713/375 |
| 6,928,473 B1 | * | 8/2005 | Sundaram et al. | 709/224 |
| 6,993,246 B1 | * | 1/2006 | Pan et al. | 386/52 |
| 7,142,129 B2 | * | 11/2006 | Hall et al. | 340/853.3 |
| 7,340,630 B2 | * | 3/2008 | Morris et al. | 713/400 |
| 7,711,009 B2 | * | 5/2010 | Kataria et al. | 370/503 |
| 2002/0027886 A1 | * | 3/2002 | Fischer et al. | 370/255 |
| 2005/0033947 A1 | * | 2/2005 | Morris et al. | 713/1 |
| 2005/0035875 A1 | * | 2/2005 | Hall et al. | 340/853.1 |
| 2008/0080563 A1 | * | 4/2008 | Kataria et al. | 370/503 |
| 2008/0228913 A1 | * | 9/2008 | Fort-Menares et al. | 709/224 |
| 2008/0247325 A1 | * | 10/2008 | Vaitaitis et al. | 370/252 |

\* cited by examiner

*Primary Examiner* — Philip Chea
*Assistant Examiner* — Fatoumata Traore
(74) *Attorney, Agent, or Firm* — Mintz Levin Cohn Ferris Glovsky and Popeo, P.C.

(57) ABSTRACT

Methods and apparatus, including computer program products, are provided for using a relative timestamp to log activity in a distributed computing system. In one aspect, there is provided a computer-implemented method. The method may include receiving a message including a first timestamp representative of when the message is sent at a first processor. A second processor may generate an entry logging receipt of the received message. The second processor may determine a second timestamp representative of a time relative to the first timestamp. The second timestamp may be included as an entry at a log at the second processor.

20 Claims, 5 Drawing Sheets

CORRELATION OF LOG INFORMATION IN A DISTRIBUTED COMPUTING ENVIRONMENT USING RELATIVE TIMESTAMPS

FIELD

The present disclosure generally relates to data processing. More particularly, the present disclosure relates to using relative timestamps to correlate information in a log of activity for a distributed computing system.

BACKGROUND

A distributed computing system includes computers (also referred to as nodes) in which services to users are provided by a plurality of computers collaborating over a network. In a distributed computing system, logging and correlating activities (also referred to as events) is desirable in order to trace, track, and debug the applications running on the distributed computing system. For example, if a request message is sent to an application or service at a first computer (or node) in the distributed computing system, that request may result in one or more additional related requests to other applications and/or services at other computers—making tracing, tracking, and debugging of the applications, services, and requests extremely complex unless the clocks of all of the computers in the distributed computing system are synchronized. However, clock synchronization is not always possible since a computer may include an application or service that does not allow clock synchronization. As a consequence, there continues to be a need to develop enhanced mechanisms for logging information in distributed computing systems to enable tracing, tracking, and/or debugging.

SUMMARY

The subject matter disclosed herein provides methods and apparatus, including computer program products, for using relative timestamps to correlate information in a log of activity for a distributed computing system.

In one aspect, there is provided a computer-implemented method for using a relative timestamp to log activity. The method may include receiving a message including a first timestamp representative of when the message is sent at a first processor. A second processor may generate an entry logging receipt of the received message. The second processor may determine a second timestamp representative of a time relative to the first timestamp. The second timestamp may be included as an entry at a log.

Variations may include one or more of the following features. The second timestamp may be determined as a value tsLx(Pr2,x) based on the following equation: tsL(Pr2,x)=tsRQ(Pr1)+Network latency+(tsRS(Pr2,x)−tsRS(Pr2)). The second timestamp may be determined as a value tsL(Pr(n+1),x) based on the following equation: tsL(Pr(n+1),x)=tsRQ(Pr(n))+Network latency+(tsRS(Pr(n+1),x)−tsRS(Pr(n+1))). The second processor may send another message including a third timestamp representative of time relative to the first timestamp. The third timestamp may be determined based on the following equation: tsRQ(Pr2)=tsRQ (Pr1)+Network latency+(tsRQ$_{local}$(Pr2)−tsRS (Pr2)). The third timestamp may be determined based on the following equation: tsRQ(Pr(n))=tsRQ(Pr(n−1))+Network latency+(tsRQ$_{local}$(Pr(n))−tsRS(Pr(n))). The entries in a log may be retrieved, wherein each entry includes a timestamp determined as tsL (Pr2, x). The entries may be correlated based on values tsL (Pr2, x). Metadata may be used to calculate the second timestamp. The metadata may enable calculation of the second timestamp relative to the initiator of the message. The processors may register to enable retrieval of metadata including one or more of the second timestamps. A plurality of events associated with the message may be logged. Moreover, each event may be logged using a timestamp determined based on the equation tsL(Pr2,x)=tsRQ(Pr1)+Network latency+(tsRS(Pr2,x)−tsRS(Pr2)).

The subject matter described herein may be implemented to realize the advantage of enabling tracing, tracking, and debugging of applications and services in a distributed computing system by using a relative timestamp to log activity without requiring clock synchronization among the computers of the distributed computing system.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1A:
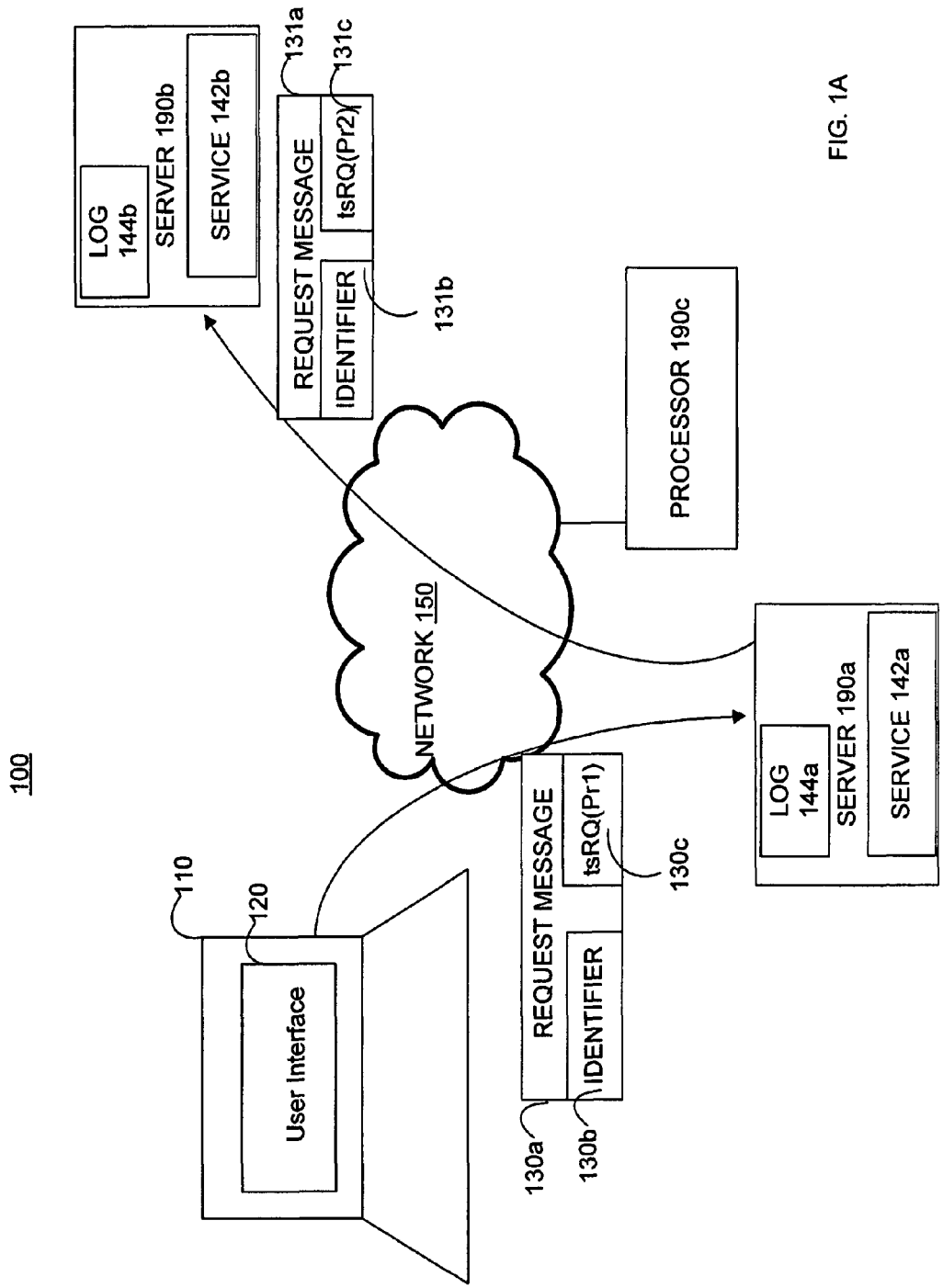
FIG. 1A depicts a block diagram of a distributed computing system implementing relative timestamps.

Like labels are used to refer to same or similar items in the drawings.

DETAILED DESCRIPTION

FIG. 1A depicts a system 100 environment capable of using relative timestamps to correlate log information of activity in a distributed computing system. The system 100 includes one or more processors, such as a computer 110, a server 190a, and processors 190b-c, and a network 150. In some implementations, computer 110, a server 190a, and processors 190b-c are implemented as nodes of a distributed computing system.

The computer 110 may include a user interface 120 for interacting with one or more services, such as services 142a-142b. A service, such as a Web service, is a software program or application capable of being accessed via standard network protocols, such as Simple Object Access Protocol (SOAP) over Hyper Text Transfer Protocol (HTTP). For example, when requested, a service may provide a catalog service over the Internet including presenting products, providing pricing, and processing purchases.

When a user of user interface 120 accesses service 142a through network 150, the computer 110 sends a request message 130a (e.g., a SOAP request message) to service 142a, so that service 142a can process the request message 130a. For example, in the case of a catalog service, the request message 130a may identify a product and provide credit card information to service 142*a* to complete a purchase of the product. The request message 130*a* may further include an activity identifier (ID) 130*b* and a timestamp (tsRQ(Pr1)) 130*c* representative of the time when the request is sent by the requester, i.e., user interface 120 and/or computer 110. For example, user interface 120 or computer 110 may include a timestamp, such as a local counter value or UTC (Universal Time Code) value, as metadata that is included within the request message 130*a* or included as a link or a pointer to the counter value or UTC value. Although FIG. 1 is described within the context of a catalog service, the timestamp tsRQ may be used in other messages as well.

When server 190*a* and service 142*a* receive the request, service 142*a*, as the so-called "responder," initially receives message 130*a* at time tsRS (Pr2), which is a local time value from a counter or a UTC value at server 190*a*. At time tsRS (Pr2, x) (corresponding to a local time x at processor 2, i.e., server 190*a*), server 190*a* logs in log 144*a* the activity (i.e., the request corresponding to request message 130*a*) using a timestamp, as described below with respect to Equation 1. In some implementations, the activity (which in this case is request message 130*a*) is logged by saving in log 144*a* the activity ID 130*b*, the timestamp tsRQ (Pr1) 130*c*, an address (e.g., an IP address or reference) identifying the requester computer 110, and the timestamp tsL (Pr2, x). The timestamp tsL (Pr2, x) is a so-called "relative" timestamp since it is determined relative to tsRQ (Pr1), which is the timestamp determined from the clock of processor 1 (in this case computer 110). The use of relative timestamp tsL(Pr2,x) enables correlating events based on the same relative time, which in this example is the timestamp determined from the clock of processor 1 (e.g., computer 110). In some implementations, the timestamp tsL(Pr2,x) is determined based on the equation as follows:

$$tsL(Pr2,x) = tsRQ(Pr1) + \text{Network latency} + (tsRS(Pr2,x) - tsRS(Pr2)), \quad \text{Equation 1,}$$

wherein tsL(Pr2,x) represents a relative time stamp of a log entry created at processor 2 (in this case server 190*a*) at time x; tsRQ(Pr1) represents a timestamp generated by processor 1 (in this case computer 110) when message 130*a* is sent; network latency represents the time it takes to transport a message (e.g., message 130*a*) from processor 1 to processor 2; tsRS(Pr2) represents a timestamp generated at processor 2 when a message (e.g., message 130*a*) is received at processor 2; tsRS(Pr2, x) represents a timestamp generated at processor 2 when the log entry is to be created at time x (using a clock at processor 2). A more general form of Equation 1 is given as follows:

$$tsL(Pr(n+1),x) = tsRQ(Pr(n)) + \text{Network latency} + (tsRS(Pr(n+1),x) - tsRS(Pr(n+1))), \quad \text{Equation 2,}$$

wherein n corresponds to the processor number in a series of processors. For example, in Equation 2 above, if message 130*a* results in four messages to a series of processors, the value of n at the last processor (i.e., processor 4) would be 4.

In some implementations, network latency may be set as a default value (e.g., 250 milliseconds) and may be measured by sending packets. Moreover, a sending processor (e.g., computer 110) may optionally define network latency, and a receiving processor (e.g., server 190*a*) may use the defined network latency when set, or, alternatively, use a default value for network latency.

Message processing latency (depicted in FIG. 1B) represents the time between receiving message 130*a* at server 190*a* and generating the log entry at server 190*a*, i.e., tsRS (Pr2, x)−tsRS (Pr2).

Figure 1B:
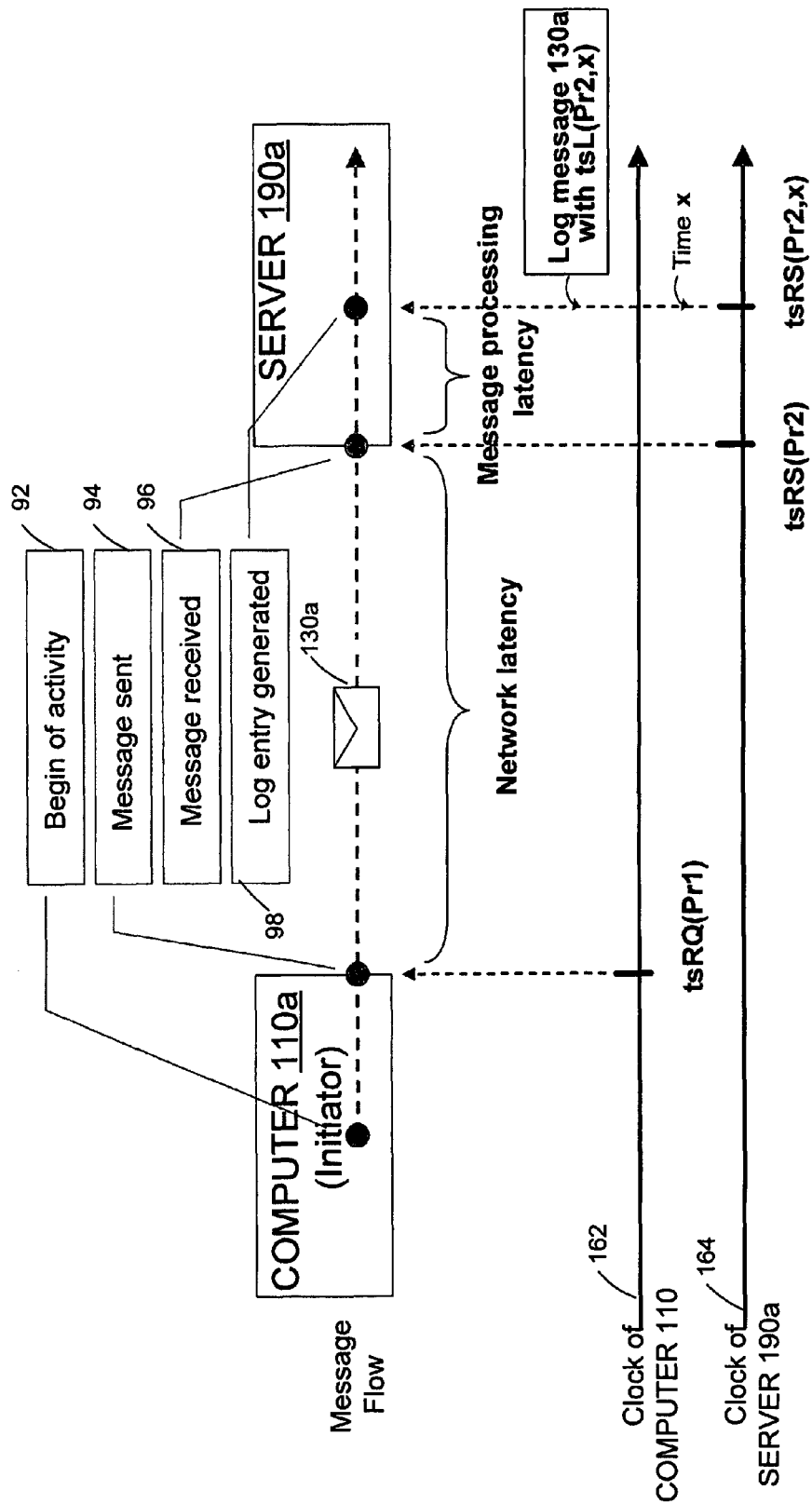
FIG. 1B depicts timelines for two processors of a distributed computing system.

FIG. 1B depicts timelines 162-164 for computer 110 and server 190*a*. The timelines represent from which clock the relative timestamps are determined. Referring to FIG. 1B, computer 110 may begin the activity 92 of sending message 130*a* by creating an activity identifier (ID). In some implementations, the activity ID remains constant and may be associated with the first request message 130*a* (e.g., a service request to an application). At 94, the message 130*a* is sent including the timestamp tsRQ (Pr1). The notation of tsRQ (Pr1) represents that the tsRQ timestamp is made relative to the clock (or timeline 162) of processor 1 ("Pr1"), which in this example is computer 110. At 96, message 130*a* is received and timestamp tsRS (Pr2) is generated to indicate receipt at server 190*a*. The notation of tsRS (Pr2) represents that the tsRS timestamp is made relative to the clock (or timeline 164) of processor 2 ("Pr2"), which in this example is server 190*a*. At 98, server 190*a* creates a log entry in log 144*a* at tsRS (Pr2, x), but rather than include tsRS (Pr2, x) in the log entry, server 190*a* includes a relative timestamp tsL (Pr2, x) determined using Equation 1 above.

FIGS. 1A and 1B depict a distributed processing environment including two processors (also referred to as nodes). However, more than two processors may be used as well. When this is the case, tsRQ is recalculated at each subsequent processor (e.g., processor 3 (Pr3), processor 4 (Pr4), etc.), and the recalculated tsRQ timestamp is included in a corresponding message sent by the processor, as described further below with respect to FIG. 1C and Equations 3 and 4. Moreover, the recalculated timestamp tsRQ represents a relative timestamp since it is recalculated relative to the timeline 162 of the initiator of the original message 130*a* (e.g., processor 1 or computer 110).

Figure 1C:
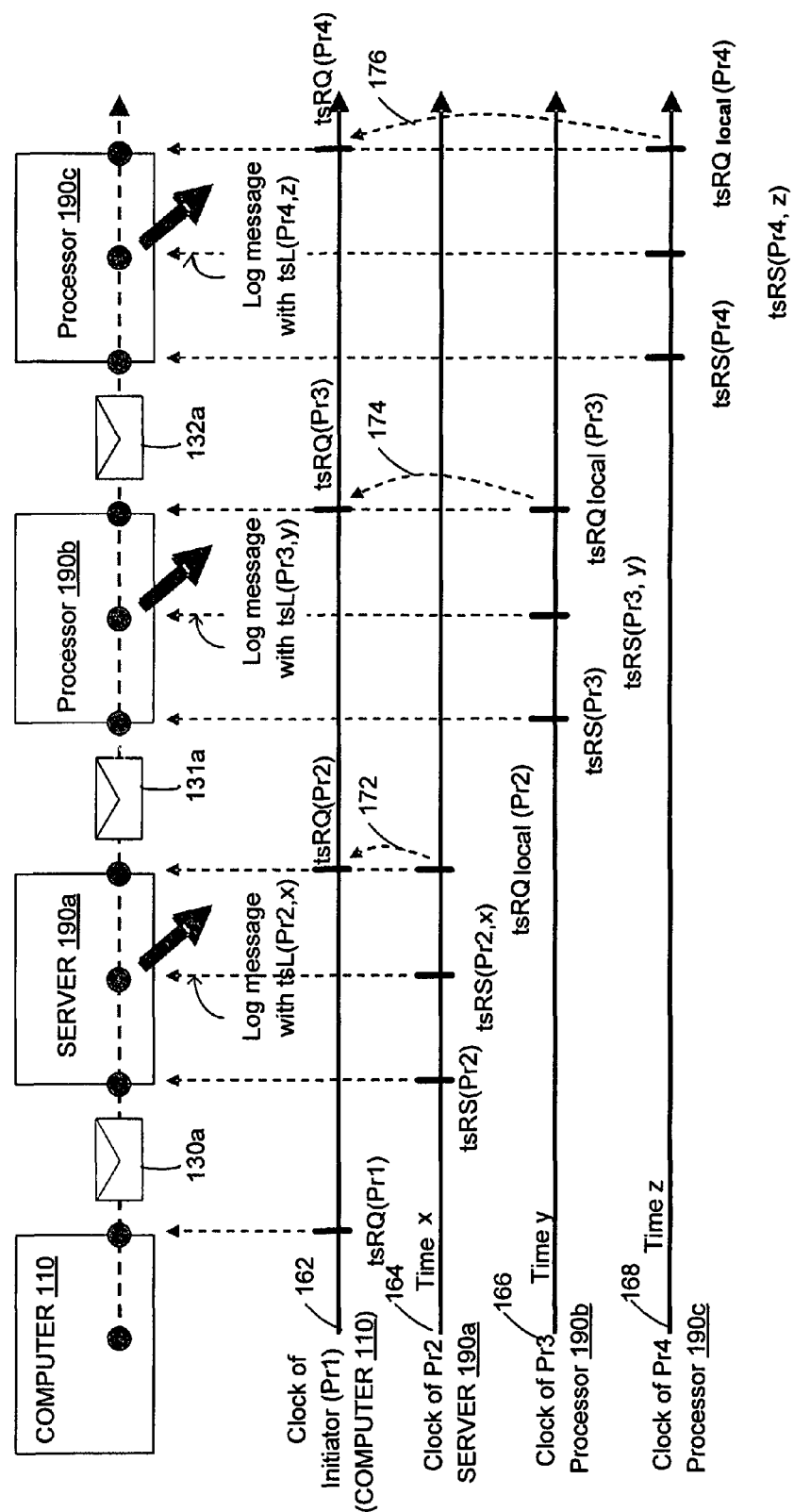
FIG. 1C depicts timelines for four processor of a distributed computing system.

FIG. 1C depicts timelines 162-168 for four processors, namely computer 110, server 190*a*, processor 190*b*, and processor 190*c*. For example, FIG. 1C may correspond to a scenario where computer 110 initiates a request leading to additional requests at other processors (e.g., server 190*a*, processor 190*b*, and processor 190*c*) to determine a response to the initiators request message 130*a*. A distributed computing system is one example of where such a scenario may be implemented. As described above with respect to FIG. 1B, computer 110 may begin the activity 92 of sending a message by creating an activity ID. The message 130*a* is sent including the timestamp tsRQ (Pr1) based on the local clock of computer 110. The message 130*a* is received and timestamp tsRS (Pr2) is generated to indicate receipt at server 190*a*. At time tsRS (Pr2, x), server 190*a* creates a log entry including a relative timestamp tsL (Pr2, x) determined using Equation 1 (or the more general Equation 2).

When server 190*a* makes additional requests to additional processors in order to respond to request message 130*a*, server 190*a* may begin the activity of sending message 131*a* by either using the same activity identifier (ID) included in message 130*a* or, alternatively, another activity ID. In any case, the activity ID is included in message 131*a* along with the timestamp tsRQ (Pr2). The timestamp tsRQ (Pr2) represents the time when the message is sent by a processor 190*a*. Moreover, the value tsRQ (Pr2) is recalculated to determine the time relative to tsRQ (Pr1) of the original initiator of the activity, which in this example is computer 110. FIG. 1C depicts at 172 that the local timestamp $tsRQ_{local}$(Pr2) is determined relative to the timeline 162 of computer 110. Server 190*a* may determine the value of the timestamp tsRQ(Pr2) based on the following equation:

$$tsRQ(Pr2) = tsRQ(Pr1) + \text{Network latency} + (tsRQ_{local}(Pr2) - tsRS(Pr2)), \quad \text{Equation 3,}$$

wherein tsRQ(Pr1) represents the timestamp generated by computer 110 when message 130a is sent to server 190; $tsRQ_{local}(Pr2)$ represents a timestamp (generated by a clock at server 190a) when message 131a is sent to processor 190b; and tsRS(Pr2) represents the timestamp generated by the clock of processor 2 (e.g., server 190a) when message 130a is received. A more generalized form of Equation 3 is as follows:

$$tsRQ(Pr(n))=tsRQ(Pr(n-1))+\text{Network latency}+ (tsRQ_{local}(Pr(n))-tsRS(Pr(n))), \quad \text{Equation 4,}$$

wherein n represents the $n^{th}$ processor. As a consequence, when the $n^{th}$ processor is 2, Equation 4 simplifies to Equation 3.

When message 131a including a timestamp tsRQ(Pr2) and an activity ID is received at processor 190b, processor 190b processes message 131a and timestamp tsRQ(Pr2) to determine timestamp tsL(Pr3,y) using Equation 2. If processor 190b sends another request (e.g., to respond to message 130b), processor 190b may include in message 132a a time stamp tsRQ (Pr3), calculated based on Equation 4 above. Moreover, in some implementations, processor 190b processes message 131a including one or more events (e.g., requests, activities, actions, or the like). When this is the case, each of the events may be processed and a corresponding timestamp, such as tsL(Pr3,y) and tsRQ(Pr3), may be determined and logged as described herein. In short, the message may be logged at tsL(Pr3,y) as well as any activity, request, action, or any other activity related to the received message 131a. Moreover, multiple events may be processed and logged using the above equations.

In some implementations, using a relative timestamps, such as tsRQ(Pr2) and tsL (Pr2,x) enables activities, such as the request and corresponding response messages, to be correlated without requiring that the clocks of the requester (e.g., computer 110) and responder (e.g., server 190a) to be synchronized. For example, computer 110, server 190a, processors 190b-c, may all use independent clocks without requiring synchronization. As used herein, a clock refers a counter, a clock, or any other suitable time keeping mechanism.

In some cases, when service 142a receives request message 130a, additional programs and/or services may be called in order to respond to the request message 130a. When that is the case, service 142a sends a request message 131a including an activity ID and timestamp tsRQ (Pr2). By using relative timestamps, such as tsRQ (Pr2) and tsLx, activities across multiple nodes may be correlated without requiring synchronization of the clocks among the nodes. Moreover, the relative timestamps when correlated enable tracing, tracking, and debugging of activities as well as sequencing of processes across nodes of a distributed computing system.

The request messages 130a, 131a, and 132a may be implemented as any type of message. Although in some implementations, SOAP messages are used, other types of messages may be used as well. Moreover, FIGS. 1A-C depict simplified versions of messages 130a, 131a, and 132a, since those messages may include additional information (e.g., Internet Protocol addresses, metadata, and the like).

The user interface 120 may be implemented as any interface that enables a user to interact with an application or program, such as service 142a, through network 150. The user interface 120 may be implemented as a browser, such as Netscape Navigator or the like, or any other type of graphical user interface. In some implementations, SAP Web Dynpro (commercially available from SAP AG, Walldorf, Germany) may be used as a model-based development environment for generating user interface 120, although other development environments may be used.

Network 150 may be any type of communications mechanism and may include, alone or in any suitable combination, the Internet, a telephony-based network, a local area network (LAN), a wide area network (WAN), a dedicated intranet, wireless LAN, an intranet, a wireless network, a bus, or any other communication mechanisms. Further, any suitable combination of wired and/or wireless components and systems may provide network 150. Moreover, network 150 may be embodied using bi-directional, unidirectional, or dedicated networks. Communications through network 150 may also implement standard transmission protocols, such as Transmission Control Protocol/Internet Protocol (TCP/IP), Hyper Text Transfer Protocol (HTTP), SOAP, RPC, or other protocols.

Server 190a may include one or more processors, such as computers, to interface with other computers, such as computer 110, and/or programs, such as user interface 120. As noted above, server 190a may be implemented as nodes of a distributed computing system.

The service 142a may be implemented as a Web service, program, group of programs, and/or component, i.e., a small binary object (e.g., an applet) or program that performs a specific function and is designed in such a way to easily operate with other components and programs.

Figure 2:
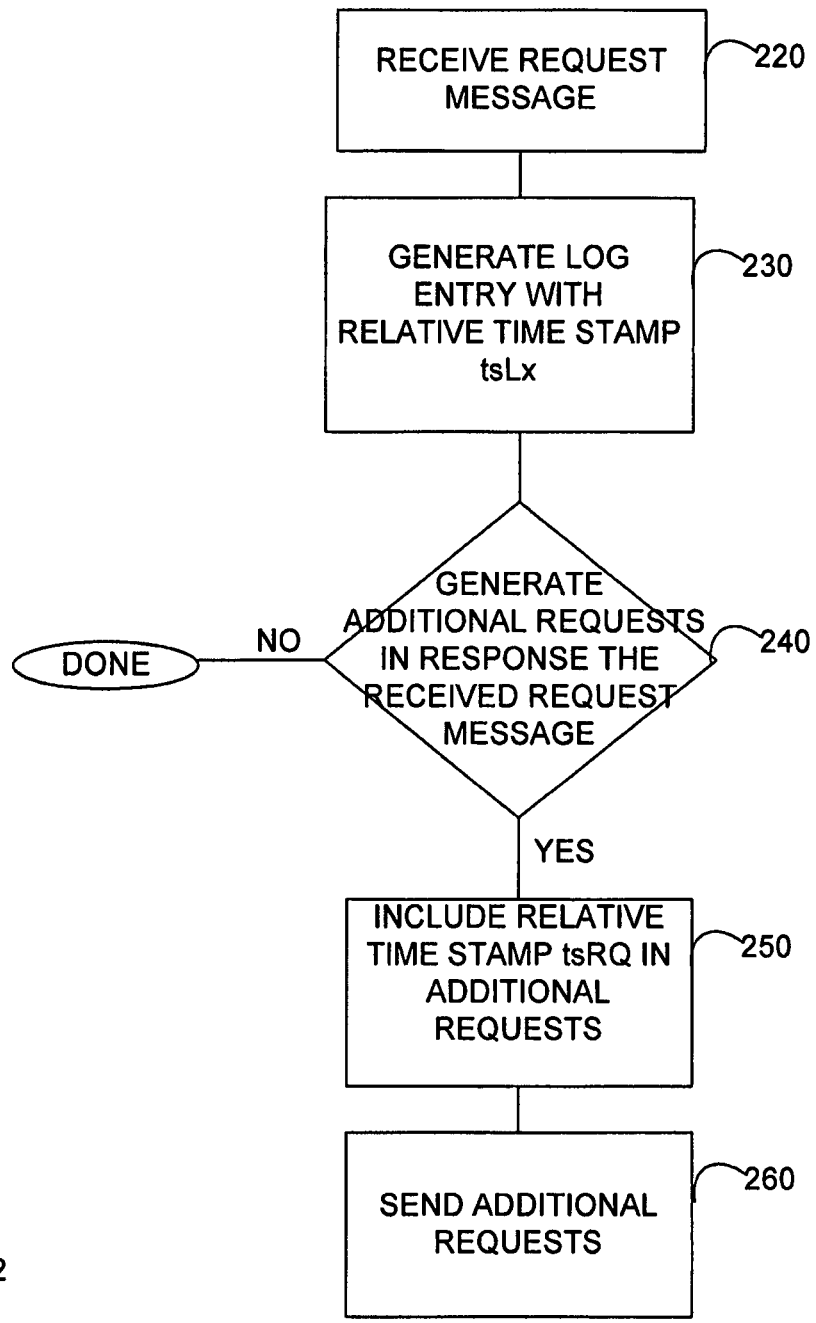
FIG. 2 depicts a flowchart for using relative timestamps.

FIG. 2 depicts a flow diagram for generating log entries in log 144a using a relative timestamp tsLx, as described above with respect to Equations 1 and 2 above. At a given time tsRQ (Pr1), computer 110 may send a request message 130a to server 190a. When the request message 130a is generated, a clock at computer 110 provides a timestamp tsRQ representative of when the request is sent.

At 220, server 190a receives the request message 130a at time tsRS (Pr(n)), where n is equal to a value of two (n=2). The time tsRS (Pr2) represents a timestamp of when the request message is received at responding server 190a.

At 230, server 190a may generate a log entry in log 144a for the activity, which in this case is a request corresponding to request message 130a. The log entry for the activity may include an activity ID 130b. The log entry may also include relative timestamp tsL, as described above with respect to Equations 1 and 2. Table 1 below depicts examples of log entries.

TABLE 1

| Activity ID | tsL | tsRQ(Pr(n − 1)) | tsRS(PR(n)) | IP address of Requestor (e.g., (Pr(1)) | Log-Message |
|---|---|---|---|---|---|
| id1 | 12313 | 123123 | 1231233 | 1.1.1.1.1 | Action description at tsL(Pr(n)) of Pr(n) |

TABLE 1-continued

| Activity ID | tsL | tsRQ(Pr(n − 1)) | tsRS(PR(n)) | IP address of Requestor (e.g., (Pr(1)) | Log-Message |
|---|---|---|---|---|---|
| id2 | 13313 | 133123 | 1331233 | 1.1.1.1.3 | Action description at tsL(Pr(n)) of Pr(n) |

At 240-250, if additional request messages are sent by service 142a in order to respond to request message 130a, service 142a may recalculate relative timestamp tsRQ, as described above with respect to Equations 3 and 4.

At 260, service 142a sends the request message 131a including the recalculated relative timestamp, e.g., tsRQ (Pr2). When request message 131a is received at processor 190b and service 142b, the process of 220-250 described above may also be performed to produce and store log information in log 144b at processor 190b.

Figure 3:
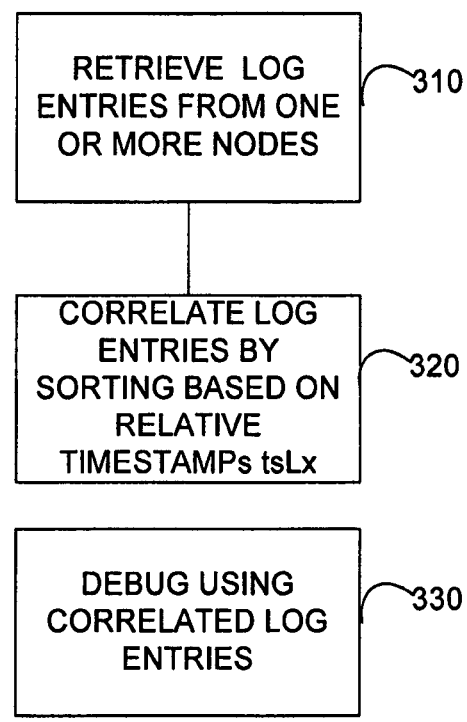
FIG. 3 depicts a process flowchart for sorting log information using relative timestamps to enable tracing, tracking, and debugging.

FIG. 3 depicts a process flow for retrieving log information from the nodes (e.g., server 190a and processor 190b) and correlating the received log information. At 310, a computer, such as computer 110, retrieves the log information from one or more nodes, such as server 190a and processor 190b. In some implementations, computer 110 generates a master log including information from the retrieved nodes. At 320, the retrieved log information is correlated by sorting the log information based on the timestamp tsLx. Since timestamps tsLx are determined relative to the timeline of the original requestor (e.g., timeline 162 of computer 110), the master log information may be accurately sorted to show a sequence of events. In some cases, the sorting also uses activity IDs to further correlate the events in the log information. At 330, the correlated master log information may be used for tracing, tracking, and debugging. For example, an event (e.g., one or more of the following: an action, activity, request, sending request message 130a, receiving a message, and the like) may be correlated with other events including events at other nodes using the timestamp tsLx described above. The correlated events may be sorted to generate a relative time sequence of the events, which can be used to trace, track, and debug the events without requiring synchronization among all of the clocks of all of the nodes of the distributed computing system.

Although the above describes logging request messages using relative timestamps, any activity in the distributed computing system may be logged using relative timestamps, such as tsLx and tsRQ. Moreover, the relative timestamps may also be used with systems other than distributed computing systems.

In some implementations, when a message is received by a processor (e.g., server 190a and processors 190b and 190c), the processor registers at a registry (e.g., another processor) to indicate that it has log information related to a message or event. Moreover, the registry may include information on how to retrieve the log information to enable correlating, tracing, debugging, tracking, and the like of the events.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A computer-implemented method comprising:
receiving, at a second processor, a first request message from a first processor, the first request message including a first timestamp indicating the time, relative to a clock of the first processor, at which the first message was sent by the first processor;
generating, at the second processor, a second timestamp indicating the time, relative to a clock of the second processor, at which the second processor receives the first request message;
generating, at the second processor, a third timestamp indicating the time, relative to the clock of the second processor, at which the second processor logs the first request message into a log of the second processor;
determining, at the second processor, a relative timestamp indicating the time, relative to the clock of the first processor, at which the second processor logged the first request message into the log of the second processor, the determining being based on the first timestamp, the second timestamp, the third timestamp, and metadata representative of network latency between the first timestamp and the second timestamp; and logging the relative timestamp into the log of the second processor.

2. The computer-implemented method of claim 1 further comprising the second processor registering at a registry an indication that information relating to the first request message has been logged at the second processor.

3. The computer-implemented method of claim 1, wherein the determining further comprises using the equation:

$$tsL(Pr2,x)=tsRQ(Pr1)+\text{network latency}+(tsRS(Pr2,x)-tsRS(Pr2)),$$

where tsL(Pr2,x) represents the relative timestamp, tsRQ(Pr1) represents the first timestamp, tsRS(Pr2) represents the second timestamp, tsRS(Pr2,x) represents the third stamp and network latency represents to the time taken to transport the first request message from the first processor to the second processor.

4. The computer-implemented method of claim 3, further comprising logging a plurality of events associated with the first request message, wherein each event is logged with the relative timestamp determined using the equation:

$$tsL(Pr2,x)=tsRQ(Pr1)+\text{network latency}+(tsRS(Pr2,x)-tsRS(Pr2)).$$

5. The computer-implemented method of claim 4 further comprising retrieving data from the log of the second processor relating to the plurality of events, including the relative timestamp.

6. The computer-implemented method of claim 5 further comprising correlating the retrieved data based on the relative timestamp.

7. The computer-implemented method of claim 1 further comprising:
sending by the second processor a second request message including a fourth timestamp indicating the time, relative to the clock of the first processor, at which the second processor sends the second request message.

8. The computer-implemented method of claim 7 further comprising determining the fourth timestamp using the equation:

$$tsRQ(Pr2)=tsRQ(Pr1)+\text{network latency}+(tsRQ_{local}(Pr2)-tsRS(Pr2)),$$

where tsRQ(Pr2) represents the fourth timestamp, tsRQ(Pr1) represents the first timestamp, tsRS(Pr2) represents the second timestamp, $tsRQ_{local}$(Pr2) represents a fifth timestamp indicating the time, relative to the clock of the second processor, at which the second processor sends the second request message and network latency represents to the time taken to transport the first request message from the first processor to the second processor.

9. The computer-implemented method of claim 1, wherein the clock of the first processor and the clock of the second processor are not synchronized.

10. A non-transitory computer-readable storage medium containing instructions to configure a processor to perform a method, the method comprising:
receiving, at a second processor, a first request message from a first processor, the first request message including a first timestamp indicating the time, relative to a clock of the first processor, at which the first message was sent by the first processor;
generating, at the second processor, a second timestamp indicating the time, relative to a clock of the second processor, at which the second processor receives the first request message;
generating, at the second processor, a third timestamp indicating the time, relative to the clock of the second processor, at which the second processor logs the first request message into a log of the second processor;
determining, at the second processor, a relative timestamp indicating the time, relative to the clock of the first processor, at which the second processor logged the first request message into the log of the second processor, the determining being based on the first timestamp, the second timestamp, the third timestamp, and metadata representative of network latency between the first timestamp and the second timestamp; and
logging the relative timestamp into the log of the second processor.

11. The non-transitory computer-readable storage medium of claim 10, wherein the determining further comprises using the equation:

$$tsL(Pr2,x)=tsRQ(Pr1)+\text{network latency}+(tsRS(Pr2,x)-tsRS(Pr2)),$$

where tsL(Pr2,x) represents the relative timestamp, tsRQ(Pr1) represents the first timestamp, tsRS(Pr2) represents the second timestamp, tsRS(Pr2,x) represents the third stamp and network latency represents to the time taken to transport the first request message from the first processor to the second processor.

12. The non-transitory computer-readable storage medium of claim 10 further comprising:
sending by the second processor a second request message including a fourth timestamp indicating the time, relative to the clock of the first processor, at which the second processor sends the second request message.

13. The non-transitory computer-readable storage medium of claim 12 further comprising determining the fourth timestamp using the equation:

$$tsRQ(Pr2)=tsRQ(Pr1)+\text{network latency}+(tsRQ_{local}(Pr2)-tsRS(Pr2)),$$

where tsRQ(Pr2) represents the fourth timestamp, tsRQ(Pr1) represents the first timestamp, tsRS(Pr2) represents the second timestamp, $tsRQ_{local}$(Pr2) represents a fifth timestamp indicating the time, relative to the clock of the second processor, at which the second processor sends the second request message and network latency represents to the time taken to transport the first request message from the first processor to the second processor.

14. A system comprising:
at least one processor; and
at least one memory, wherein the at least one processor and the at least one memory are configured to provide a method comprising:
receiving, at a second processor, a first request message from a first processor, the first request message including a first timestamp indicating the time, relative to a clock of the first processor, at which the first message was sent by the first processor;
generating, at the second processor, a second timestamp indicating the time, relative to a clock of the second processor, at which the second processor receives the first request message;
generating, at the second processor, a third timestamp indicating the time, relative to the clock of the second processor, at which the second processor logs the first request message into a log of the second processor;
determining, at the second processor, a relative timestamp indicating the time, relative to the clock of the first processor, at which the second processor logged the first request message into the log of the second processor, the determining being based on the first timestamp, the second timestamp, the third timestamp, and metadata representative of network latency between the first timestamp and the second timestamp; and logging the relative timestamp into the log of the second processor.

15. The system of claim 14, wherein the determining further comprises using the equation:

$$tsL(Pr2,x)=tsRQ(Pr1)+\text{network latency}+(tsRS(Pr2,x)-tsRS(Pr2)),$$

where tsL(Pr2,x) represents the relative timestamp, tsRQ(Pr1) represents the first timestamp, tsRS(Pr2) represents the second timestamp, tsRS(Pr2,x) represents the third stamp and network latency represents to the time taken to transport the first request message from the first processor to the second processor.

16. A computer-implemented method comprising:

receiving, at a processor (n+1), a request message from a processor (n), the request message including a timestamp tsRQ(Pr(n)) indicating the time, relative to a clock of the processor (n), at which the request message was sent by the processor (n);

generating, at the processor (n+1), a timestamp tsRS(Pr(n+1)) indicating the time, relative to a clock of the processor (n+1), at which the processor (n+1) receives the request message;

generating, at the processor (n+1), a timestamp tsRS(Pr(n+1), x) indicating the time, relative to the clock of the processor (n+1), at which the processor (n+1) logs the request message into a log of the processor (n+1);

determining, at the processor (n+1), a relative timestamp tsL(Pr(n+1), x) indicating the time, relative to the clock of the processor (n), at which the processor (n+1) logged the request message into the log of the processor (n+1), the determining being based on the timestamp tsRQ(Pr(n)), the timestamp tsRS(Pr(n+1)), the timestamp tsRS(Pr(n+1), x), and metadata representative of network latency between the timestamp tsRQ(Pr(n)) and the timestamp tsRS(Pr(n+1)); and logging the relative timestamp tsL(Pr(n+1), x) into the log of the processor (n+1), wherein n corresponds to the processor number in a series of processors.

17. The computer-implemented method of claim 16, wherein the determining further comprises using the equation:

$$tsL(Pr(n+1),x)=tsRQ(Pr(n))+\text{network latency}+(tsRS(Pr(n+1),x)-tsRS(Pr(n+1))),$$

wherein network latency represents to the time taken to transport the request message from the processor (n) to the processor (n+1).

18. The computer-implemented method of claim 17, further comprising:

logging a plurality of events associated with the request message, wherein each event is logged with the relative timestamp tsL(Pr(n+1),x) determined using the equation:

$$tsL(Pr(n+1),x)=tsRQ(Pr(n))+\text{network latency}+(tsRS(Pr(n+1),x)-tsRS(Pr(n+1))).$$

19. The computer-implemented method of claim 16 further comprising:

sending, by the processor (n+1), a second request message including a timestamp tsRQ(Pr(n+1)) indicating the time, relative to the clock of the processor (n), at which the second request message was sent by the processor (n+1).

20. The computer-implemented method of claim 19 further comprising determining the timestamp tsRQ(Pr(n+1)) using the equation:

$$tsRQ(Pr(n+1))=tsRQ(Pr(n))+\text{network latency}+(tsRQ_{local}(Pr(n+1))-tsRS(Pr(n+1))),$$

wherein $tsR_{local}(Pr(n+1))$ indicates the time, relative to the clock of the processor (n+1), at which the processor (n+1) sent the second request message and network latency represents to the time taken to transport the request message from the processor (n) to the processor (n+1).

* * * * *